(12) United States Patent
Schulz et al.

(10) Patent No.: US 8,350,188 B2
(45) Date of Patent: Jan. 8, 2013

(54) METHOD FOR MATERIAL REMOVAL AND DEVICE FOR CARRYING OUT SAID METHOD

(75) Inventors: Wolfgang Schulz, Langerwehe (DE); Dirk Petring, Kerkrade (NL); Frank Schneider, Aachen (DE); Markus Niessen, Niederzier (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 565 days.

(21) Appl. No.: 12/602,012

(22) PCT Filed: May 23, 2008

(86) PCT No.: PCT/EP2008/004134
§ 371 (c)(1),
(2), (4) Date: Jan. 25, 2010

(87) PCT Pub. No.: WO2008/145311
PCT Pub. Date: Dec. 4, 2008

(65) Prior Publication Data
US 2010/0176103 A1 Jul. 15, 2010

(30) Foreign Application Priority Data

May 25, 2007 (DE) .......................... 10 2007 024 701

(51) Int. Cl.
*B23K 26/38* (2006.01)
(52) U.S. Cl. .............................. 219/121.72; 219/121.67
(58) Field of Classification Search ............. 219/121.66, 219/121.69, 121.8, 121.72–121.77
See application file for complete search history.

(56) References Cited

U.S. PATENT DOCUMENTS

| | | | | |
|---|---|---|---|---|
| 4,275,288 A | * | 6/1981 | Makosch et al. | 219/121.75 |
| 4,908,493 A | * | 3/1990 | Susemihl | 219/121.67 |
| 5,286,947 A | | 2/1994 | Clyde et al. | |
| 6,175,096 B1 | | 1/2001 | Nielsen | |
| 2004/0047268 A1 | * | 3/2004 | Yanagisawa et al. | 369/112.02 |
| 2004/0084427 A1 | | 5/2004 | Talwar et al. | |
| 2005/0024743 A1 | | 2/2005 | Camy-Peyret | |
| 2008/0000888 A1 | * | 1/2008 | Schulz et al. | 219/121.72 |
| 2008/0210672 A1 | * | 9/2008 | Meyer et al. | 219/121.64 |
| 2009/0032512 A1 | * | 2/2009 | Regaard et al. | 219/121.83 |
| 2010/0176102 A1 | * | 7/2010 | Petring et al. | 219/121.72 |

FOREIGN PATENT DOCUMENTS

| | | |
|---|---|---|
| DE | 196 13 252 A1 | 4/1996 |
| DE | 198 16 793 C1 | 4/1998 |
| DE | 101 40 533 A1 | 8/2001 |
| DE | 103 29 075 A1 | 6/2003 |
| EP | 0200089 A1 | 4/1986 |
| EP | 19933825 A1 | 7/1999 |
| EP | 1 837 696 A1 | 3/2006 |
| JP | 62104693 A | 10/1985 |
| JP | 2006130691 A | 11/2004 |

* cited by examiner

*Primary Examiner* — Savitr Mulpuri
(74) *Attorney, Agent, or Firm* — Karl F. Milde, Jr.; Eckert Seamans Cherin & Mellott, LLC

(57) ABSTRACT

A method for material removal to a predetermined removal depth from a workpiece employs a laser beam consisting of one or more sub-beams, each of the latter having a defined beam axis. The axis of the laser beam or the individual axes of the sub-beams are guided along a removal line at a predetermined travelling speed and the laser beam has a predetermined spatial energy flow density that defines a Poynting vector S with a value $I_0 f(x)$ and a direction s, the spatial energy flow density creating a removal face with an apex formed by the leading part of the removal face in the removal direction and the face, creating a removal edge.

33 Claims, 5 Drawing Sheets

Detail "A"

METHOD FOR MATERIAL REMOVAL AND DEVICE FOR CARRYING OUT SAID METHOD

BACKGROUND OF THE INVENTION

The invention relates to a method for the material removal to a predetermined removal depth from a workpiece by means of a laser beam consisting of one or more sub-beams, each of the latter having a defined beam axis, whereby the axis of the laser beam or the individual axes of the sub-beams are guided along a removal line at a predetermined travelling speed and the laser beam has a predetermined spatial energy flow density that defines a Poynting vector S with a value $I_0 f(x)$ and a direction s, the spatial energy flow density creating a removal face with an apex formed by the leading part of the removal face in the removal direction and said face creating a removal edge. The invention furthermore relates to a device for carrying out the method.

Laser cutting is an established method for material removal through fusion at which the created removal depth encompasses the entire thickness of the workpiece. When cutting metals, the removal face is molten and is also referred to as cutting face. Among the laser-aided manufacturing methods, it takes the leading position in industrial applications. From the perspective of the user, the increase in productivity of the method and an improved quality are constant requests.

It is known that high-performance $CO_2$ lasers (10µ emitters) with a wavelength of the radiation of approx. 10 µm and with a laser power of 1-6 kW are used industrially for laser cutting (in the field of macro applications for sheet metal in a range from 1 mm to 30 mm). In addition, fiber lasers and disc lasers (1µ emitters) with a wavelength of the radiation of approx. 1 µm and with a laser power of 1-8 kW are used for laser cutting. In particular these radiation sources offer economic advantages and are, therefore, used increasingly. However, it is becoming apparent that the cut quality at the workpiece is dependent, for example, on the radiation source in use (fiber laser, disc laser 1 µ-emitter, gas laser 10µ emitter) and, for example, on the sheet thickness to be cut and the feed rate. For this reason, the following significant quality features must be achieved reliably during laser fusion cutting:

Productivity of the Process:

Shorter machining times and the high-quality removal or separation of greater material thicknesses are fundamental demands. For this reason, increasingly greater laser powers and systems with high-quality drives are introduced in manufacturing. The development aims at expanding the technical limits of process control.

Quality of the Cut Edge:

In addition to roughness and adhering burrs as well as the formation of oxide coatings, evenness and right angles are significant quality features for the cut edge. The process chain cutting-welding is an example by which the significance of the quality of the cut edge for preparing the joining gap can be recognized. To be able to generate with a laser slim welding seams that require no post-processing by grinding or dressing, a cut of the components to be joined with plane, right-angled as well as smooth burr- and oxide free cut edges is desired. The following sub-points should, therefore, be considered:

With an increasing sheet metal thickness, the cut edge exhibits increasingly rough gouges, which appear in particular in the lower part of the cut edge (or abrasion kerf, respectively). This problem is even worse with greater sheet thicknesses.

In particular with low or high feed rates the melt is not fully removed from the bottom edge. The attached and then solidifying melt forms the undesired burr. The mechanisms of how such burrs are generated are understood only in part.

The formation of cracks and pores in the weld seam can be caused by oxidized joining edges, such as the ones that occur with flame cutting. For this reason, fusion cutting with an inert cutting gas is employed to obtain oxide-free cut edges.

The known techniques for cutting metals using laser radiation are divided through the involved mechanisms for introducing the cutting energy into Laser beam cutting with reactive cutting gas stream Laser beam cutting with inert cutting gas stream.

In laser beam cutting with a reactive cutting gas stream (e.g., oxygen, compressed air), the laser beam and an exothermic chemical reaction together provide the cutting energy. Techniques for laser beam cutting with a reactive cutting gas stream are further differentiated by whether the laser beam acts dominantly in the cut gap (laser beam flame cutting) or is additionally radiated onto the upper side of the sheet metal (burn-up-stabilized laser beam flame cutting).

In laser beam cutting with an inert cutting gas stream (e.g., nitrogen), the laser beam generates the cutting energy. Laser beam cutting with an inert cutting gas stream is further differentiated by the varying mechanisms for accelerating/expelling the melt. In addition to the effect of the cutting gas stream, the evaporation of molten materials may occur and accelerate the melt. The driving effect increases with an increase in the feed rate due to the evaporation.

Three process variants are differentiated in laser cutting with an inert cutting gas stream:

(1) Laser Beam Fusion Cutting:

The temperature at the surface of the melt remains below the evaporation temperature and the melt is expelled by the cutting gas stream only. This process variant is used industrially for fine, medium and thick metal sheets. The melt flows out primarily at the apex of the cutting face—in front of the laser beam axis. Gouge and burr formation constitute limitations to the quality.

(2) Fast Cutting:

The evaporation temperature is exceeded in the lower part of the cutting face and the expelling effects based on the cutting gas and of the evaporating material are comparable. The melt flows out primarily in the front area of the cutting face, to the right and left of the laser axis. This process variant can be used for fine and medium sheet metal. Gouge and burr formation constitute limitations to the quality.

(3) High-Speed Cutting:

The evaporation temperature is exceeded almost on the entire cutting face. The expelling effect due to evaporation is dominant. The melt flows around the laser beam axis and closes a portion of the cutting gap in the wake of the laser beam and is expelled there through the effects of the cutting gas. This process variant is used for fine sheet metal.

SUMMARY OF THE INVENTION

The principal objective of the present invention is to provide a method for material removal to a predetermined removal depth with which the gouge and burr formation can be minimized and the laser radiation during the removal process is formed optimally. It is known from prior art that improper settings of the removal parameters (e.g., cutting parameters) can cause an unnecessary strong increase in the gouge amplitude with an increase in the removal depth.

Examples are a gas pressure that is too low, a removal kerf that is too narrow (e.g., with fine cutting) or a feed rate that is too high. The central task is, therefore, to avoid the formation of gouges with unnecessary large amplitude that cannot be reduced even after appropriate use of known measures. The objective is founded based on a surprising observation of the prior art by the inventors: When using selected radiation sources for laser cutting, such as the 1µ emitter (fiber laser, disc laser, etc.), for example, or when cutting large workpieces, large gouge amplitudes occur that cannot be avoided using known means. Also the known state of research does not offer explanatory information regarding the cause or the mechanisms that result in the undesired large gouge amplitudes.

From experiential observations, it became known that the undesired and today unavoidable gouges can change at a region of a certain removal depth (or cutting depth) from small values in the gouge amplitude to significantly greater values. This change can occur in a region of the cutting depth that is small compared to the thickness of the workpiece. During a cut, this region may occur at varying depths on the cut edge (or removal edge, respectively).

The objective to be solved therefore consists in providing methods that can be used to suppress or avoid entirely the effects of this not yet known mechanism of gouge formation. An additional objective consists in establishing the parameters that affect the not yet known change from small to large values in the gouge amplitude, beginning at a certain removal depth (or cutting depth, respectively).

In addition, devices shall be provided for carrying out such a method.

These objectives are achieved with a method for material removal to a predetermined removal depth from a workpiece by means of a laser beam consisting of one or more sub-beams, each of the latter having a defined beam axis, whereby the axis of the laser beam or the individual axes of the sub-beams are guided along a removal line at a predetermined travelling speed and the laser beam has a predetermined spatial energy flow density that defines a Poynting vector S with a value $I_0 f(x)$ and a direction s, the spatial energy flow density creating a removal face with an apex formed by the leading part of the removal face in the removal direction and said face creating a removal edge, which is characterized in that the respective incident angles $\alpha$ of the removal face formed by the normal vectors n of the removal face and the directions s of the Poynting vectors are set in such a way that they do not exceed a maximum value $\alpha_{max}$ in a predefined region around the apex of the removal face, whereby exceeding the maximum value is detected in the change from a small gouge amplitude in an upper part of the removal edge to a large amplitude in a lower part of the removal edge.

The objectives are also accomplished by a device for carrying out the method for the material removal with a device generating a laser beam consisting of one or more sub-beams, whereby the laser beam or the respective partial beams each have a defined beam axis, and with devices with which the axis of the laser beam or the individual beam axes are guided along a removal line at a predetermined travelling speed such that the spatial energy flow density creates a removal face with an apex formed by the leading part of the removal face in the removal direction and said face creates a removal edge and that the laser beam is set such that it exhibits a specified spatial energy flow density defining a Poynting vector S, which is characterized in that devices are provided with which the respective incident angles $\alpha$ of the removal face formed by the normal vectors n of the removal face and the directions s of the Poynting vectors can be set in such a way that they do not exceed a maximum value in a predefined region around the apex of the removal face.

One preferred measure according to the method lies in increasingly reducing the gouge amplitude in the lower part of the removal gap by having the respective incident angles $\alpha$ not exceed the maximum value $\alpha_{max}$ in a region with a greater distance from the apex of the removal front.

With the measures according to the method, it is preferred to set the incident angles such that the Poynting vector S is rotated laser-internal or laser-external using beam-shaping optics. A laser-internal setting of the Poynting vector S should be used if, for example, the cutting task requires too small a working distance between the beam-shaping optics and the workpiece and for this reason it would not be advantageous to use a laser-external device, while a laser-external rotation should be used if, for example, frequently changing cutting tasks are to be accomplished with a device and a continuous adjustment of parameters of a laser-internal optic would be too elaborate, or if the function of the laser (for example its stability over time) is affected or if the load of the additional or modified optical components for the laser radiation would become too big with a laser-internal rotation.

The incident angles $\alpha$ can be set by rotating the Poynting vector S on the removal face through a laser-internal or laser-external beam-shaping optic and by using gaseous and/or fluid mediums as beam-shaping optics. An alternative option is to set the incident angle $\alpha$ by using laser-internal or laser-external beam-shaping optics to cause the Poynting vector S to rotate on the removal face and by using diffractive, refractive, reflecting and/or dispersive optics as the beam-shaping optics.

The incident angles $\alpha$ can also be set by setting the distribution of the value $I_0 f(x)$ of the spatially varying energy flow density with greater diameter. One example for increasing the diameter is setting a focal position above or below the workpiece.

According to the invention, it was recognized that during the removal process, i.e., while the removal gap is created, an inner instability exists for the movement of the removal face that leads to fluctuation in the width of the removal gap and to the gouges in the region of the removal edge (cutting edge) on the workpiece.

Thus, with the above-stated stipulations, a control quantity $$dq_A/dx = g(\alpha)$$

with $q_A = \mu A(\mu) I_0 f(x)$, $\mu = \cos(\alpha)$ is stated, where $\alpha_{max} = \alpha$ constitutes the transition to instability. The removal process is instable at locations on the removal face, where the incident angles $\alpha$ exceed a maximum value $\alpha_{max} < \alpha$. The cosine $\mu$ of the incident angle $\alpha$ is the scalar product $$\mu = s(x) * n(x)$$

of the unit vector in the direction s of the Poynting vector and the normal vector n on the removal face. The degree of absorption of the laser radiation on the removal face depends on the incident angle and is designates as $A(\mu)$. The intensity, which is the value of the Poynting vector S averaged over time, of the laser radiation is specified by a maximum value $I_0$ and a spatial distribution $f(x)$ ($0 < f < 1$). The quantity x designates the distance of the removal face distorted by the fluctuations from its undistorted value $x = 0$. In particular, the geometric shape of the removal face, and thus of the normal vectors n on the removal face, depends on a predetermined value $I_0 f(x)$ of the Poynting vector S. According to the invention, the incident angle is set in time ($\alpha(t)$) such that $\alpha_{max} > \alpha(t)$ applies to all times t. In this manner, no rough gouges are created from the excitation (or instability) and the gouge amplitude assumes the minimally possible value that is caused only after an unavoidable fluctuation of the set fixed removal parameters. A change—that may occur as a sudden increase—of the gouge amplitude in the region of the removal face is used as a conditioning measure, with $I_1 < d$, where $z = I_1$ specifies the depth of the transition to the excitation of gouges with small amplitudes due to unavoidable fluctuations to gouges with large amplitudes due the excitation (or instability) and d specifies the removal depth from the top side of the workpiece (maximum is the thickness of the workpiece), such that: $\alpha_{max} > \alpha$.

The incident angle $\alpha$, as stated above, is given by:

$$\alpha = \alpha[\underline{s}^* \underline{n}])$$

with $\underline{s}$ = unit vector in the direction of the Poynting vector $\underline{S}$, $|\underline{s}| = 1$
$|\underline{S}|$ = Value of the Poynting vector
$\underline{n}$ = normal vector, $|\underline{n}| = 1$ According to the invention, the following points are considered for setting the incident angles:

A full 2-dimensional phase space is utilized that is spanned in the laser beam through the value and the direction of the Poynting vectors The value and the direction of the Poynting vectors are set independently from each other Large values of $M^2$ are set intentionally, that is $M^2 > 1$, where $M^2 = 1$ indicates the physical limit for the best quality of the laser radiation Large values of the beam radius $w_0$ are set intentionally, A large value of the aberration is set intentionally, because it was recognized that the values for the incident angle are reduced by these measures. In contrast to this, with the prior art variations/changes of the process parameters are carried out only in an approximately 1-dimensional phase space, for example variations of the cutting parameters or variations of the optics parameters, with the specification that the physical ideal value $M^2 = 1$ shall be achieved as well as possible for the quality of the laser radiation and the beam radius $w_0$ shall be as small as possible and that in addition to that, no aberration should be present. The stipulation $M^2 = 1$ constitutes a fixed relationship of value and direction of the Poynting vector for a spatially three-dimensional radiation field. If the stipulation, for example due to technical imperfection, is not only carried out approximately but ideally, then it affects a limitation to a 1-dimensional phase space.

To the extent that these documents speak of "system" or "system-specific" properties, respectively, then this refers to the totality of the components for carrying out the process or the specific properties of the totality of components, respectively, which comprise, for example, a beam source, a handling machine and components for guiding the gas stream. With a time-related occurrence of system-specific fluctuations of the incident angles $\alpha$, the originating fluctuation amplitude of the removal parameters should be reduced such that $$\alpha_{max} > \alpha + \Delta\alpha(t)$$

applies. Laser power, intensity distribution, gas pressure and/or direction and value of the travel speed of the laser beam or its axis, respectively, are taken into account as removal parameters. Even with fixed settings for removal parameter values of the system, technically unavoidable fluctuations of these values will always occur.

The aforementioned rule $\alpha_{max} > \alpha + \Delta\alpha(t)$ states that technically unavoidable fluctuations of the fixed value settings for the removal parameters are of such a size that they lead to fluctuations $\Delta\alpha$ of the set incident angle $\alpha$ and that because of this, the permitted value $\alpha_{max}$ of the incident angle $\alpha(t) = \alpha + \Delta\alpha(t)$ is exceeded during cutting through too large a fluctuation width $\Delta\alpha(t)$; in this manner, the maximum incident angle $\alpha_{max}$ is exceeded and the excitation is generated. To the extent that these documents talk of "excitation", this refers to the effects of incident angles that are too large and affect an instability in the form of a wave-shaped movement of the removal face with an increasing wave amplitude.

It has been shown that with the method according to the invention, the conventional techniques in particular for removing metals from a workpiece to the full separation of workpieces (cutting) with laser radiation can be improved such that a quality cut with small gouge amplitudes and essentially without burr formation can be achieved when cutting larger sheet metal thicknesses and with greater cutting speeds.

With the methods without intentionally set modulation as known thus far, the parameters for removal are experientially derived from the energy balance averaged over time at the cutting face. The gouges are nearly spatially periodical fluctuations of the profile of the cut edge and a result of dynamic processes during cutting. Thus, a dynamic task is to be resolved.

All known methods with a modulation of the cutting parameters do not lead to the desired reduction in the gouge amplitudes; they aim primarily at avoiding burr with low travel speeds as occur when cutting contours, a greater cutting speed and a greater cuttable material thickness without changes in the quality of the cut edge.

With the invention, parameters are specified with which the axially running shafts are dampened based on the unavoidable fluctuations of the cutting parameters and are not excited, that is, a new—until now unresolved—dynamic task is resolved.

The invention utilizes the knowledge that gouges are generated because removal fluctuations are either excited by an inner instability due to unavoidable fluctuations of the cutting parameters or because the unavoidable fluctuations are within a frequency interval, which leads to large amplitudes of removal fluctuations and the amplitudes of the unavoidable fluctuations are too large. Until today, this inner instability is unknown and for the first time has been recognized by the inventors as a relevant quantity for the gouge formation and utilized by them for improving the quality of the removal or cutting, respectively.

Thus, it has been recognized that the transition from dampened to excited removal fluctuations due to external fluctuations depend in particular on the local incident angel $\alpha$ of the radiation, the maximum value $I_0$ of the intensity in the laser beam and the spatial distribution $f(x)$ of the intensity in the laser beam.

The transition to excited removal fluctuations occurs, when the incident angle $\alpha$ of the radiation is set to too big a value, the maximum value $I_0$ of the intensity in the laser beam is set too high and the distribution $f(x)$ in the direction x perpendicular to the absorption or cutting face, respectively, is set to decline too heavily, namely $df(x)/dx < c < 0$.

The incident angle $\alpha$ in question of the removal face that is defined by the respective normal vector n of the removal face and the direction s of the respective Poynting vector, can be set by increasing an aberration of the optical image in the optics.

The aberration in the optics can be increased by refractive (e.g., lenses), reflective (e.g., mirror), diffractive (e.g., apertures) and dispersive (e.g., particles) optics. Refractive optics are used for small laser power (e.g., <6 kW at the $CO_2$ laser).

Reflective optics are advantageously used for beam-shaping of large laser powers where the load of refractive optics through heat-up due to absorption can lead to undesired aberrations or even to the destruction of the optical elements. Diffractive optics is advantageously used when large deflection angles are to be created or when only edge regions of the laser radiation are to be shaped.

The aberration in the optics can be increased by achieving the aberration in the optics by using a combination of concave and convex lenses. Such optics is advantageous due to the fact that particularly large values can be set for the value of the aberration. With the combination of lenses that creates the aberration, the collimation and/or focusing of the laser radiation can be carried out at the same time such that the structural expenditure can be kept low.

The aberration in the optics can be increased by using optical elements with aspherical surfaces. The optical elements can be designed as axicon or as Fresnel lens. An axicon should be preferred when a ring-shaped distribution f(x) with increasing values in the removal face shall be set while a Fresnel lens should offers advantages when large deflection angles are to be achieved.

The aberration in the optics can also be generated by laser-internal or laser-external gradient index optics that can be designed, for example, as gradient index fibers or gradient index lenses.

For the value of aberration to be adjustable, the optics is designed as adaptive optics.

Under the stipulation that the laser radiation has a value $I_0$ f(x) of the spatially varying energy flow density with a maximum value $I_0$ and a distribution f(x) (0<f<1), the incident angle is set by setting the width of the distribution f(x) with the predefined removal depth monotonously increasing.

In addition, the incident angles shall be set along the apex of the removal face by creating an elliptical cross-section using beam-shaping inside or outside of a laser resonator, whereby the large half-axis points in the direction of the removal line, whereby the apex of the removal face is defined as the leading part of the removal face in the removal direction. This measure utilizes the fact that the excitation is avoided only within a distance of the apex where the largest wave amplitudes occur due to the excitation and that the excitation outside this area, where smaller wave amplitudes occur due to the excitation, is intentionally permitted.

Under the stipulation that the laser radiation has a value $I_0$ f(x) of the spatially varying energy flow density with a maximum value $I_0$ and a distribution f(x) (0<f<1), the incident angle is set by suppressing (hiding or redistributing) the edge regions of the distribution f(x), where smaller values of spatially varying energy flow densities are present, to such an extent that no removal occurs. This measure avoids unnecessarily small incident angles, which can occur in particular in the edge area of the distribution.

Several laser beams can be used to set the incident angle or a laser beam can be separated into several beam components using beam-splitting optics, by setting the partial beams to different focus depths and by setting the partial beams with an increasing focus depth to a smaller beam radius or a greater Raleigh length and/or a greater power. Such a measure has the advantage that the excitation is avoided even when a particularly steep removal face is to be created and should be taken when large workpiece thicknesses are to be removed or a high travel speed is to be achieved. The greater technical expenditure of using several laser beams that are generated, for example, with several laser beam sources and thus independent and without phase relation, is advantageous because an incoherent overlaying of the respective wave fields becomes utilizable and the desired adjustment options for the two degrees of freedom, value and direction, of the Poynting vectors S can be achieved on the removal face.

To avoid the excitation when large workpiece thicknesses are removed and a high travel speed is reached, the incident angle should be set by additionally setting the position of the beam axis of the partial beams with an increasing focus depth monotonously offset against the removal direction.

Under the stipulation that the laser radiation has a value $I_0$ f(x) of the spatially varying energy flow density with a maximum value $I_0$ and a distribution f(x) (0<f<1), the distribution f(x) is set to decline less severely or even to increases on the removal face, which decreases the incident angles. In this case, preferably the component of the distribution f(x) that declines spatially with x should be set to decline more weakly (e.g., widened Gaussian distribution). Here, laser radiation also refers to the cooperation of several partial beams and the distribution then describes the superposition of several partial beams.

To further reduce the gouge formation in the lower part of the removal edge, the pre-defined area, where the incident angle is set smaller than the permitted value must encompass a greater distance from the apex. This is achieved by setting the component of the distribution f(x) that declines spatially with x constant, that is, in a top-hat shape.

If it is required that the gouge amplitude reaches the smallest value in the lower part of the removal gap, then the pre-defined area should comprise the greatest distance from the apex. This is achieved by setting the spatial distribution f(x) in the area of the removal face spatially increasing and, therefore, ring-shaped.

The distribution f(x) of the spatially varying energy flow density can be set by employing one or more axicon(s) for beam-shaping. The setting can also be carried out by using optics that create the aberrations and that have been mentioned above.

The thermal emission of the hot surface of the melt film in the region of the cutting face and a potentially occurring undercut and the reflections of an additional lighting source can be recorded with a camera in order to determine and evaluate the excitation of waves running in the axial direction during machining.

Such a lighting source is assigned to the upper edge of the cutting face and the thermal effects of preheating of a surface of the material are determined in order to then determine the position of the removal face at the upper edge. The position of the removal face at the upper edge determined in this manner enters the determination of the incident angle.

The expansion of the intensive lighting area of the camera shot and the intensity of the measurement signal are evaluated in order to monitor the actually resulting geometric shape of the cutting face by balancing them with the values of the specially formed laser radiation measured prior to cutting in order to monitor in this manner the values for the incident angle α actually achieved with the setting as well as to additionally monitor the control efficiency.

In the course of monitoring, the thermal emission of the hot surface of the melt film can be registered using a photo diode; the intensive lighting area and the intensity of the measurement signal are also recorded qualitatively by a spatially averaged signal of the photo diode.

Below are some general considerations, especially with regard to the given geometries in the removal region at a workpiece as well as exemplary embodiments of the device according to the invention with reference being made to the drawings.

DESCRIPTION OF THE PREFERRED EMBODIMENTS

Figure 1:
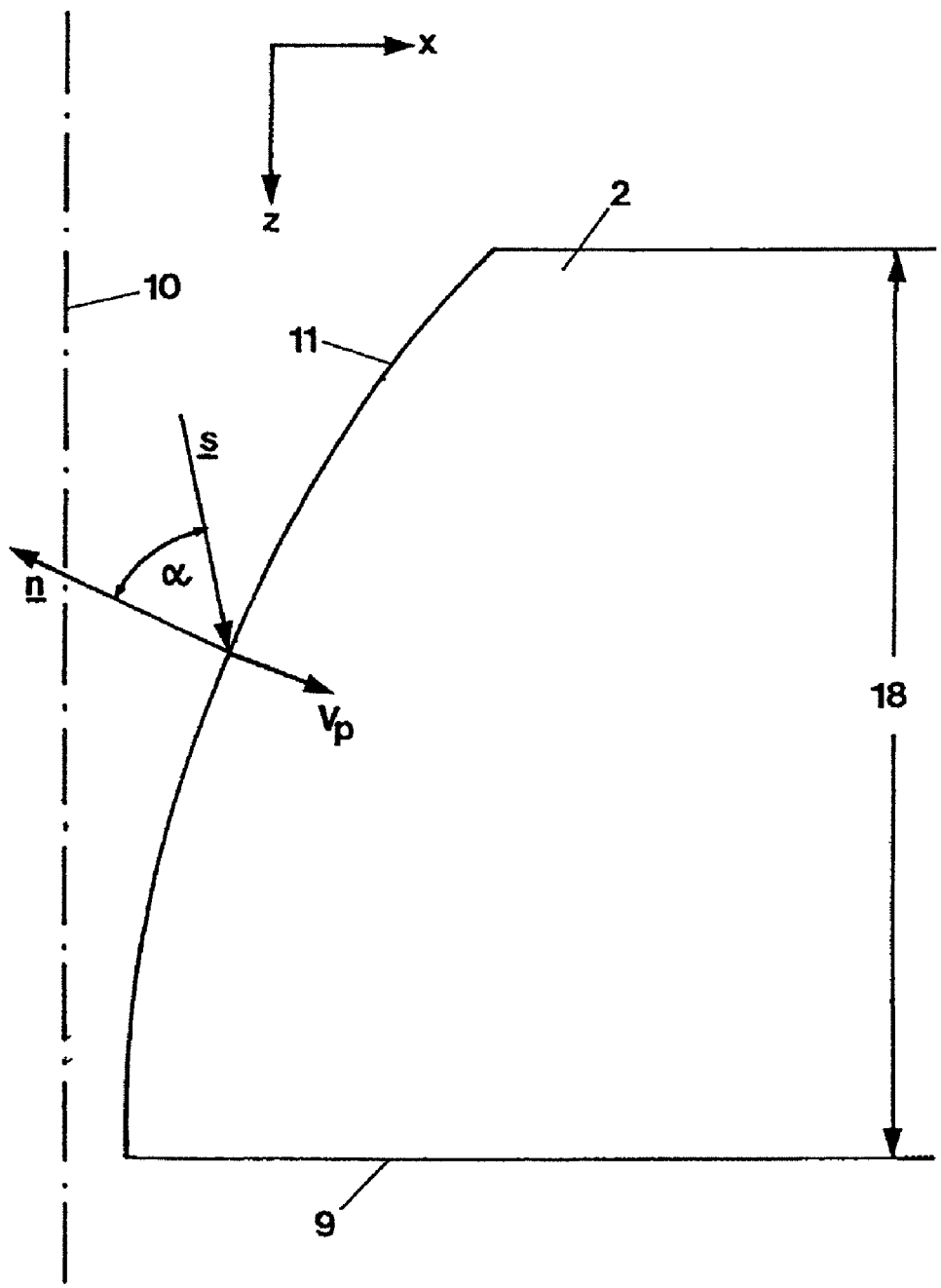
FIG. 1 shows a removal along a removal line I-I in FIG. 2, in order to explain the geometric situation that is considered for the invention.

The preferred embodiments of the present invention will now be described with reference to FIGS. 1-5 of the drawings. Identical elements in the various figures are designated with the same reference numerals.

As has been explained, unnecessarily large fluctuations of the removal parameters that go beyond the unavoidable fluctuations and are reflected in the gouge image, should be identified as avoidable fluctuations and should at least be reduced.

Figure 2:
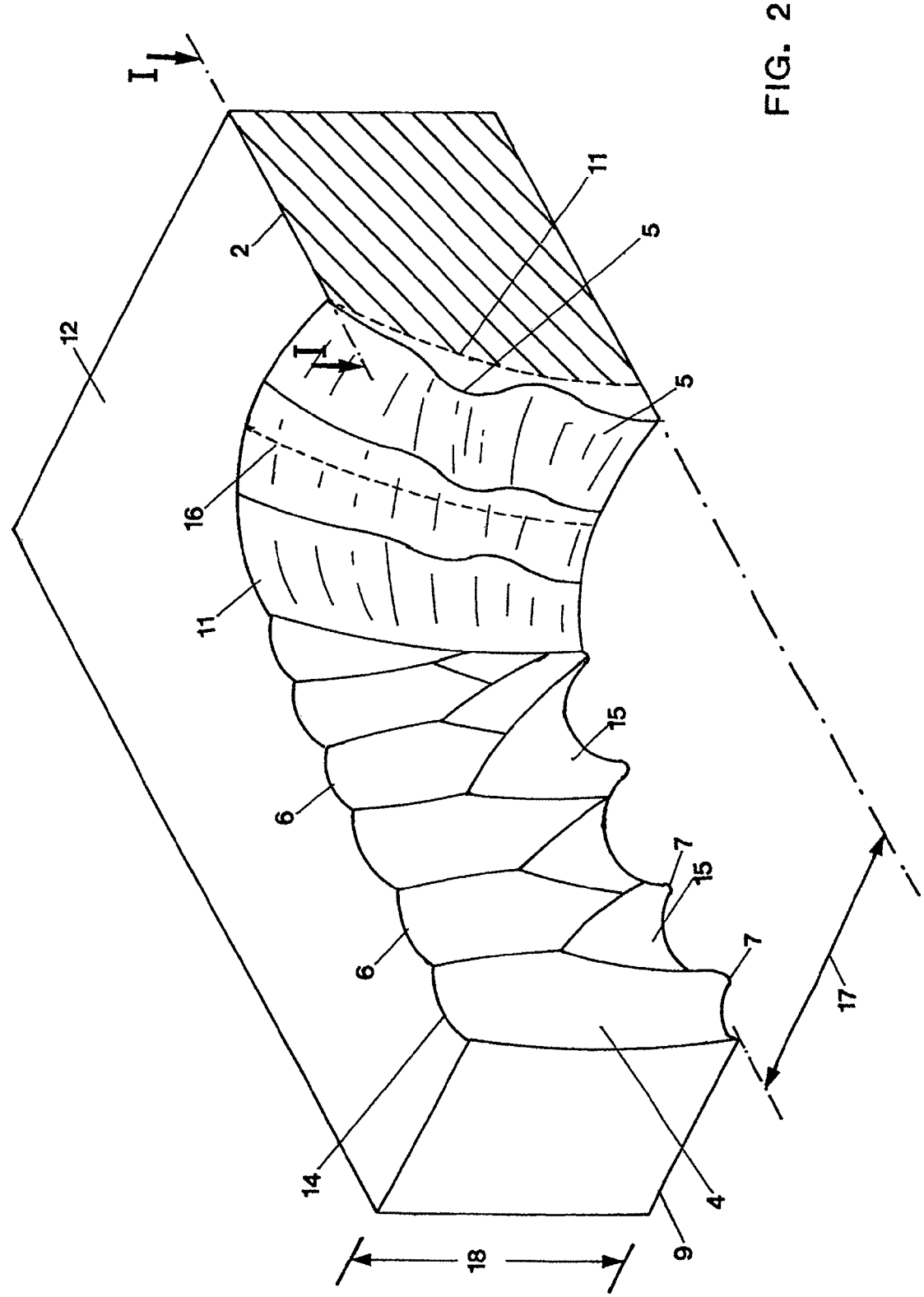
FIG. 2 shows a schematic, perspective view of a material piece on which a removal edge is formed along a removal edge under material removal using laser radiation.

FIG. 2 shows schematically a cut 1 generated with a laser beam along a removal line I-I (reference character 2) in a workpiece 3. A removal of the material in the cut 1 is carried out through fusing, possibly also evaporating, of the workpiece material with the support of a gas stream enveloping the laser beam. With regard to the material of the workpiece, the gas stream can be reactive but also inert.

The cut 1 is a cutting gap with two cut edges or removal edges 4, respectively (only one of which is shown in the "semi-section" of FIG. 2) and a removal front 11. Typically, the removal edges or the cut edges 4, respectively, show more or less distinctive gouges 6 and possibly a burr 7 at the lower cut edge 8 on the bottom side 9 of the workpiece.

Gouges 6 and burr 7 may require post-processing and should be avoided or at least reduced.

Based on FIG. 1, a few theoretical contemplations will be made that present a cut along a removal line I-I in FIG. 2 in the center of the cut 1.

A fraction of the partial intensity AI of a laser beam with the beam axis 10 is absorbed and melts the material of the workpiece 3. The molten removal face 11 is now moved at a speed $v_p$ in the x-direction. In the stated coordinates, "z" indicates—starting at the upper side 12 of the workpiece—the respective strike location of the partial intensity ΔI in the separation or cutting gap of the cut 1. The movement of the molten removal face, also referred to as apex, is thus dependent on the absorbed energy flow density $q_A$ of the laser beam. The absorbed energy flow density $q_A$ in turn is dependent on the incident angle α of the beam axis 10 of the laser beam on the removal face 11 and on the degree of absorption A, which is dependent on the used laser wavelength λ and on the cosine of the incident angle α. It shall be noted that in the subsequent contemplations the use of an incident angle α of the laser beam axis 10 of the focused laser beam 13 constitutes an approximation only. More correctly, the basis must be the angle of the normal ph on the respective phase surface in the laser beam (Poynting vector) (see FIG. 3).

Figure 3:
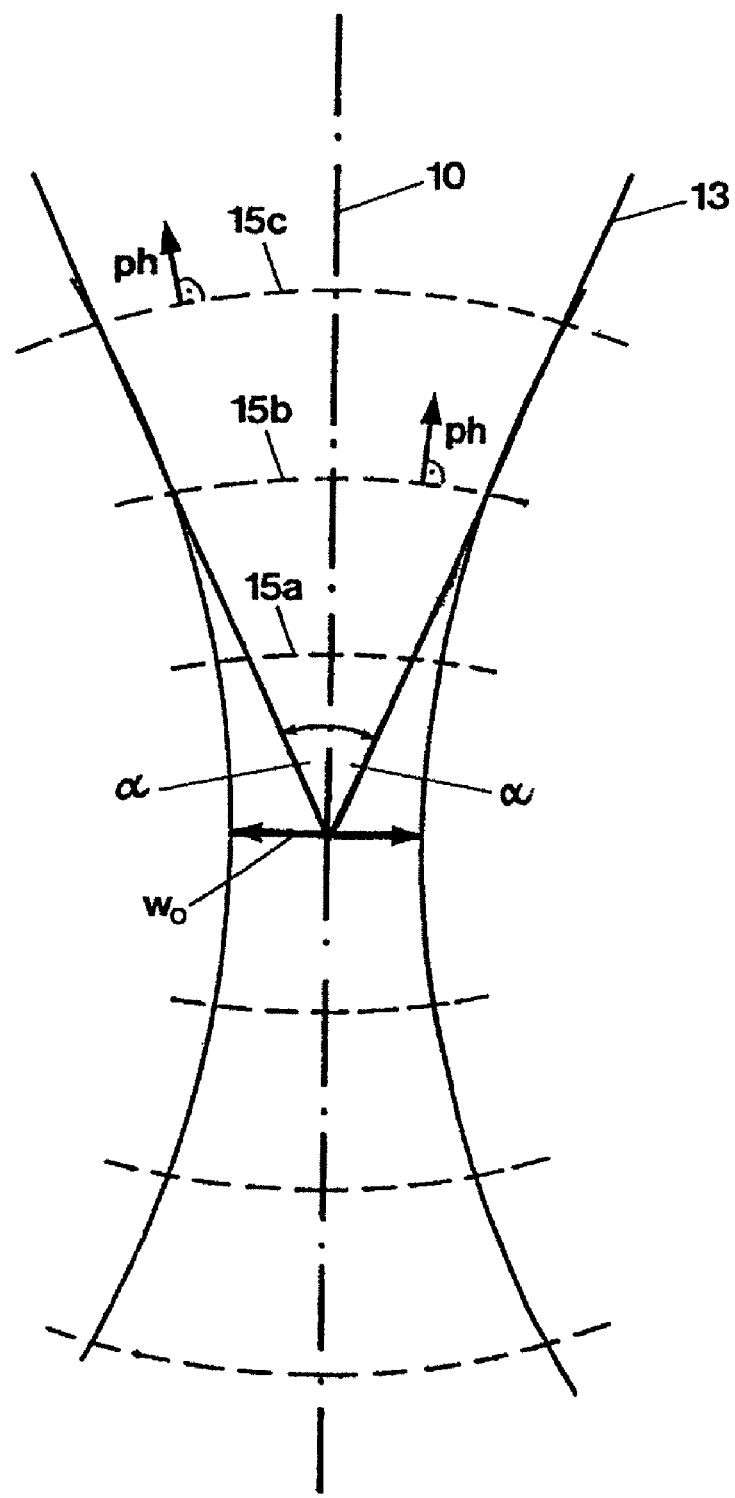
FIG. 3 shows a presentation of a phase surface of the waist radius of a focused laser beam and the beam axis thereof based on a Gaussian beam.

FIG. 3 now shows a correlation between the phase surfaces $15a, 15b, 15c, \ldots$, the waist radius $w_0$ of a focused laser beam 13 and the beam axis 10 based on the Gaussian beam of the zeroth order. Gaussian beams of a higher order as are often used in material machining, however, no longer show this simple presentation.

As again shown in FIG. 2, gouges 6 with small gouge amplitudes, i.e., in the direction of the upper side 12 of the workpiece can be observed along the removal or cut edge 4 and are designated with the reference character 14. In the lower part, on the other hand, large gouge amplitudes become apparent under certain circumstances and are designated with the reference character 15, that is, they are in the region toward the lower side 9 of the workpiece.

The border of a predefined region is designated with the reference character 16 in FIG. 2, whereby this predefined region is that region where axially extending waves (reference character 5) can be observed that are generated in the molten removal face 11.

Reference character 17 designates the half-width of the cut 1 created with the laser beam, while the reference character 18 designates the removal depth.

As shown in FIG. 1, the cosine $\cos(\alpha)=s*n$ of the incident angle α is formed from the scalar product of the unit vector s of the Poynting vector $S=I(x)$ s and the normal vector n on the absorption face 11.

It shall be remembered here that as stated above, the knowledge was obtained that rough gouges occur due to the inner instability of removal or cutting, respectively. The control variable for the transition to instability or for the excitation, respectively, of removal fluctuations can be stated. It was furthermore determined that gouges occur at removal processes with both 10μ emitters and 1μ emitters due to the same mechanisms. Fundamentally, gouges occur due to fluctuations of the cutting parameters (laser and machine parameters) that cause fluctuations of the removal speed (removal fluctuations).

The transition to the excitation is a change from a dampened response behavior of the cutting face movement to instability or an almost sudden change from a desired small to an undesired large sensitivity of the removal fluctuations to external fluctuations of the cutting parameters.

The physical quantity $|dq_A(x, z, t)/dx|$ is a control variable for the transition from the dampened response behavior of the cutting face movement to instability. According to the invention, this transition to excitation is avoided in order to reduce the amplitudes of the gouge formation. To avoid the transition to excitation, the control variable $dq_A(x, z, t)/dx$ is set or reduced, respectively.

Among other things, the control variable depends on the degree of absorption and thus on the wavelength of the laser radiation. The typical value for the 10μ emitter is smaller by a factor of up to 4 compared to the 1μ emitter, such that the effect of incident angles that are too big for the technically and scientifically better examined 10μ emitter can occur only in technically uninteresting border cases; the effect of the transition to instability as well as the control variable for the transition are, therefore, not known.

Figure 4:
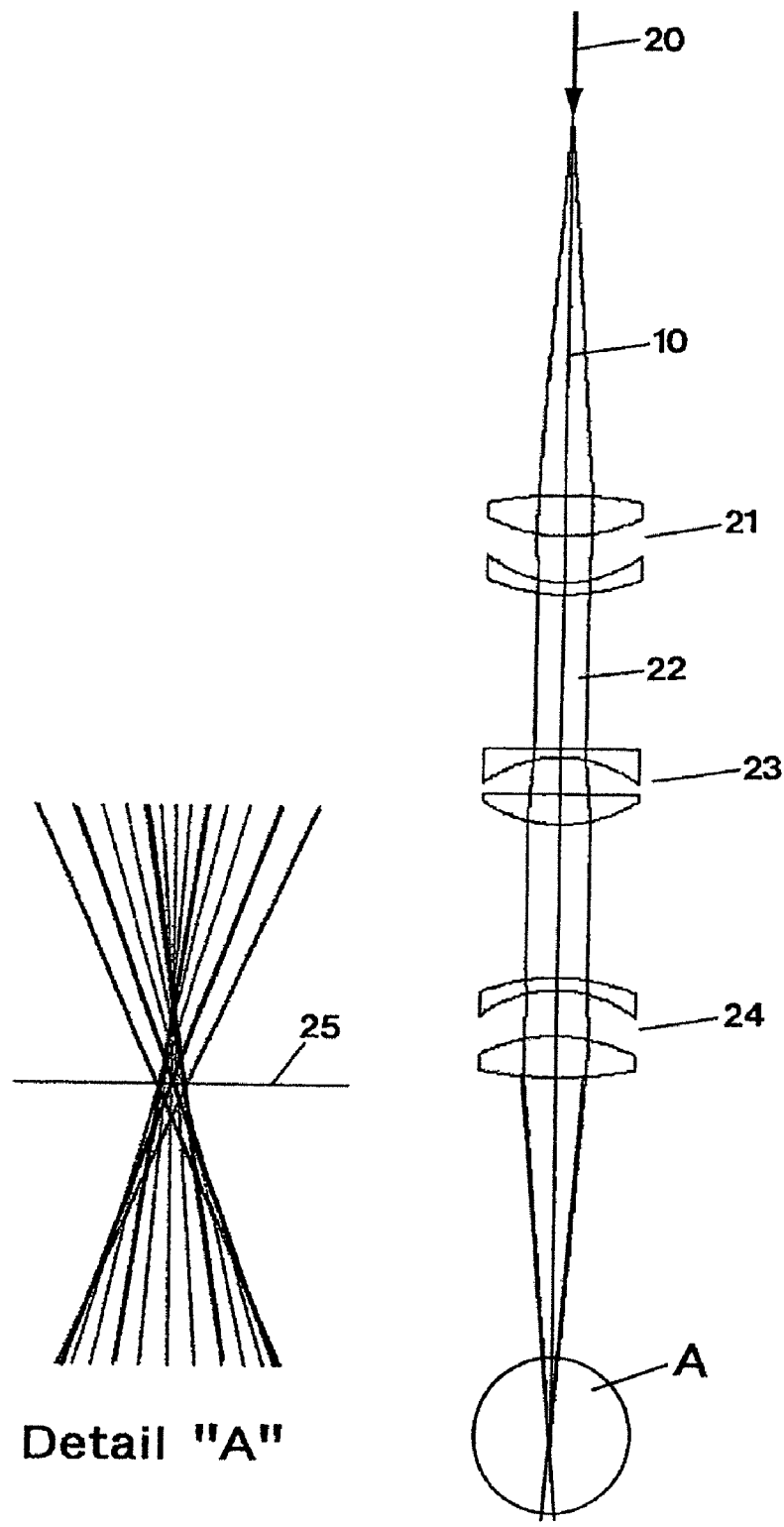
FIG. 4 shows schematically a presentation of an example of the device according to the invention with the essential optical components with detail "A" being presented magnified.

According to the present invention, after crossing over the transition to instability, an avoidable, in time quickly varying movement of the removal face back into the stationary position occurs from unavoidable fluctuations or deviations respectively, from the stationary form of the removal face. The deviation of the speed $v_p(x, z, t)$ from the travel speed that grows monotonously with the value of the control variable, and thus the time $T_{Relaxation}$, with which an unavoidable deviation of the face position returns to the stationary position, is significant and according to the invention, the removal parameters are set such that the deviation of the speed $v_p(x, z, t)$ assumes small values and that, therefore, the time for the relaxation $T_{Relaxation}$ becomes bigger than the time $T_{Escape}$ for the melt to escape across the entire cutting depth. FIG. 4 shows schematically a device in order to carry out the described method according to the invention. This device has the purpose of achieving material removal across a predetermined removal depth.

The device comprises as a radiation source optionally a laser with a fiber-guided laser radiation, in general designated with the arrow 20. The radiation emitted by the laser 20 or the fiber optic, respectively, with the beam axis being designated with the reference character 10, is collimated via a collimation optic 21 and the collimated laser beam 22 is provided to an aberration optic 23, which in the shown embodiment is comprised of concave-convex optics.

The radiation emitted by the aberration optic 23 is than focused via a focusing optic 24 onto a workpiece (not shown here) with the focusing region being shown magnified in detail "A". Looking at this detail "A", the focus with an aberred beam can be recognized around an indicated plane 25.

These collimation and focusing optics 21, 24 can be designed as one lens or as multi-lens systems. The aberration optic 23 can also be designed from other combinations of concave and convex surfaces and transmissive optics could also be replaced by reflective and/or diffractive optics but also by diffuse optics. It is also possible to combine the focusing optic and/or collimation optic and the aberration optic in one optical system.

Figure 5:
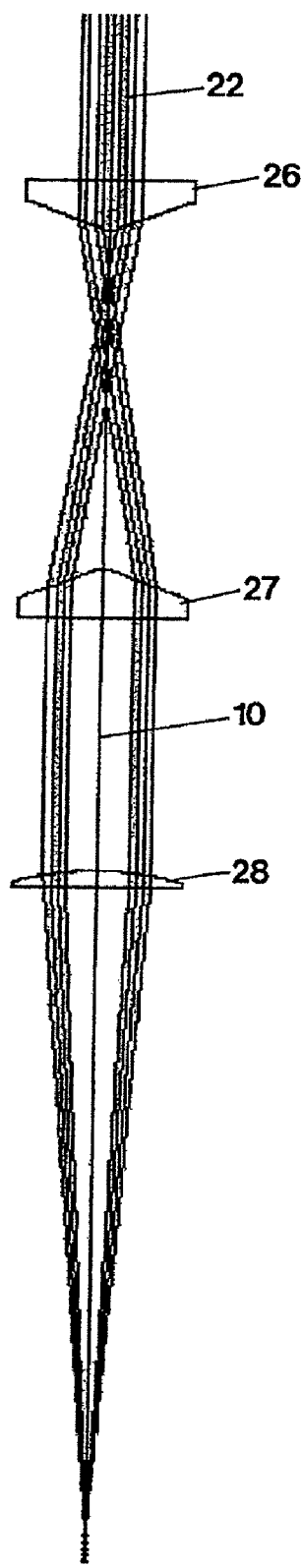
FIG. 5 shows a modified structure of the device of FIG. 4 using axicons.

FIG. 5 shows an embodiment where the aberration optic 23 of FIG. 4 is made up of two axicons 26, 27. These axicons have equal angles of the outer surfaces that are oriented pointing towards each other. The focusing optic 28 of FIG. 5 is presented schematically by a single lens.

The axicons 26, 27 of the aberration optic of FIG. 5 can have equal or unequal angles of the outer surfaces or can have a reverse orientation with regard to the direction of propagation of the laser radiation. It is also possible to use one axicon or more than two axicons. Furthermore, axicons can be used that exhibit curved surfaces or also such axicons that are designed as reflective optics.

There has thus been shown and described a novel method and apparatus for material removal said method which fulfills all the objects and advantages sought therefor. Many changes, modifications, variations and other uses and applications of the subject invention will, however, become apparent to those skilled in the art after considering this considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A method for material removal to a predetermined removal depth from a workpiece by means of a laser beam comprising one or more sub-beams, each of the sub-beams having a defined beam axis, wherein the axis of the laser beam or the individual axes of the sub-beams are guided along a removal line at a predetermined travelling speed and the laser beam has a predetermined spatial energy flow density that defines a Poynting vector S with a value $I_0 f(x)$ and a direction s, the spatial energy flow density creating a removal face with an apex formed by the leading part of the removal face in the removal direction and said face creating a removal edge, the improvement wherein the respective incident angles $\alpha$ of the removal face formed by the normal vectors n of the removal face and the directions s of the Poynting vectors are set in such a way that they do not exceed a maximum value $\alpha_{max}$ in a predefined region around the apex of the removal face, and wherein exceeding the maximum value is detected in the change from a small gouge, amplitude in an upper part of the removal edge to a large gouge amplitude in a lower part of the removal edge, wherein the incident angle $\alpha$ is given by:

$\alpha = \alpha[s*n])$ with s=unit vector in the direction of the Poynting vector S, $|s|=1$, where $|S|$=value of the Poynting vector, and n =normal vector, $|n|=1$;

and wherein $\alpha_{max} > \alpha + \Delta\alpha(t)$ applies and wherein $\Delta\alpha(t)$ are the timely, technically unavoidable fluctuations of the incident angle $\alpha$.

2. A method as set forth in claim 1, wherein the gouge amplitude in the lower part of the removal edge is reduced by the predefined region comprising a greater distance from the apex.

3. A method as set forth in claim 1, wherein the incident angles $\alpha$ are set in that the Poynting vector rotated on the removal face using a laser-internal or a laser-external optic.

4. A method as set forth in claim 1, wherein the incident angles $\alpha$ are set by rotating the Poynting vector S on the removal face through a laser-internal or laser-external beam-shaping optic and by using at least one of gaseous and fluid mediums as beam-shaping optics.

5. A method as set forth in claim 1, wherein the incident angles $\alpha$ are set by rotating the Poynting vector S on the removal face through a laser-internal or laser-external beam-shaping optic and by at least one diffractive, refractive, reflecting and dispersive optics as beam-shaping optics.

6. A method as set forth in claim 1, wherein the incident angles $\alpha$ are set by setting the distribution of the value $I_0 f(x)$ of the spatially varying energy flow, density with a greater diameter.

7. A method as set forth in claim 1, wherein with a time-related occurrence of system-specific fluctuations of the incident angles $\alpha$, the originating fluctuation amplitude the removal parameters are reduced.

8. A method as set forth in claim 1, wherein the removal parameters include at least one of laser power, intensity distribution, gas pressure and direction and value of the travel speed are considered as removal parameters.

9. A method as set forth in claim 1, wherein the incident angles $\alpha$ are set by creating or increasing the value of the aberration in a beam-shaping optic.

10. A method as set forth in claim 1, wherein the incident angles $\alpha$ are set by creating or increasing the value of an aberration in a beam-shaping optic and wherein at least one of gaseous and fluid mediums are used as the beam-shaping optic.

11. A method as set forth in claim 1, wherein the incident angles $\alpha$ are set by creating or increasing the value of a positive or negative spherical aberration or of a chromatic aberration in an optic.

12. A method as set forth in claim 10, wherein the aberration in the optic is achieved by using at least one of the diffractive, refractive, reflecting and dispersive optics.

13. A method as set as set forth in claim 9, wherein the aberration in the optic achieved by using a combination of a concave and a convex lens.

14. A method as set forth in claim 13, wherein with the combination of lenses that creates the aberration, at least one of collimation and focusing of the laser radiation is carried out at the same time.

15. A method as set forth in claim 9, wherein the aberration in the optic increased by using optical elements with aspherical surfaces.

16. A method as set forth in claim 15, wherein the optical elements are an axicon or a Fresnel lens.

17. A method as set forth in claim 9, wherein the aberration the optic is created by gradient index optics.

18. A method as set forth in claim 9, wherein the optic is an adaptive optic, that allows the value of the aberration to be adjusted.

19. A method as set forth in claim 1, wherein the adjustments are carried out controlled for adaptation to the processing parameters, 20. A method as set forth in claim 19, wherein the parameters are select from the group consisting of a type of material, material thickness, cutting speed and laser power, at least one of before and during machining.

21. A method as set forth in claim 1, wherein the laser radiation has a value $I_0 f(x)$ of the spatially varying energy flow density with a maximum value $I_0$ and a distribution $f(x)$ ($0<f<1$) and the incident angle $\alpha$ is set by setting the width of the distribution $f(x)$ with the predefined removal depth monotonously increasing.

22. A method as set forth in claim 1, wherein the incident angles a are set to the apex of the removal face by creating an elliptical cross-section using beam-shaping inside or outside of a laser resonator, whereby the large half-axis points in the direction of the removal line.

23. A method as set forth in claim 1, wherein the laser radiation has a value $I_0 f(x)$ of the spatially varying energy flew density with a maximum value $I_0$ and a distribution $f(x)$ ($0<f<1$) and wherein the incident angles $\alpha$ are set by using beam-shaping optics within or outside a laser resonator to suppress the edge regions of the distribution $f(x)$, whereby small values of spatially varying energy flow densities are present, to such an extent that no removal occurs.

24. A method as set forth in claim 1, wherein several laser beams are used to set the incident angles $\alpha$ or a laser beam is separated into several beam components using beam-splitting optics, by setting the individual laser beams or partial beams to different focus depths and by setting the individual laser beams or the partial beams with an increasing focus depth to a smaller beam radius and a greater Raleigh length.

25. A method as set forth in claim 1, wherein several laser beams are used to set the incident angles $\alpha$ or a laser beam is separated into several beam components using a beam-splitting optics, by setting the individual laser beams or partial beams to different focus depths and by setting the individual laser beams or the partial beams with an increasing focus depth to a smaller beam radius and a greater Raleigh length and a greater power.

26. A method as set forth in claim 24, wherein the incident angles $\alpha$ are set by additionally setting the position of the beam axis of the individual laser beams or of the partial beams with an increasing focus depth monotonously offset against the removal direction.

27. A method as set forth in claim 25, wherein the incident angles $\alpha$ are set by additionally setting the position of the beam axis of at east one of the individual laser beams and of the partial beams with an increasing focus depth monotonously offset against the removal direction.

28. A method as set forth in claim 1, wherein the laser radiation has a value $I_0 f(x)$ of the spatially varying energy flow density with a maximum value $I_0$ and a distribution $f(x)$ ($0<f<1$) and wherein the distribution $f(x)$ is set to decline less severely or even to increase on the removal face.

29. A method as set forth in claim 28, wherein the part the distribution $f(x)$ that declines spatially with x is set to decline more weakly (widened distribution).

30. A method as set forth in claim 28, wherein the part of the distribution $f(x)$ that declines spatially with x is set as a constant.

31. A as set forth in claim 28, wherein the spatial distribution $f(x)$ is set to increase in the area of the removal face.

32. A method as set forth in claim 28, wherein the distribution $f(x)$ of the value $l_0 f(x)$ of the spatially varying energy flow density is set by using one or more axicons for beam-shaping.

33. A method as set forth in claim 28, wherein the distribution $f(x)$ of the value $l_0 f(x)$ of the spatially varying energy to flow density is set by using optics that create aberrations.

* * * * *